July 5, 1960 O. K. DOOLEN 2,944,201

WIPER VOLTAGE COMPENSATED SERVOSYSTEM

Filed Dec. 23, 1957 2 Sheets-Sheet 1

INVENTOR.
ORVILLE K. DOOLEN
BY
[signature]
ATTORNEY

WIPER VOLTAGE COMPENSATED SERVOSYSTEM

Filed Dec. 23, 1957 2 Sheets-Sheet 2

INVENTOR.
ORVILLE K. DOOLEN
BY
[signature]
ATTORNEY

United States Patent Office 2,944,201

Patented July 5, 1960

2,944,201

WIPER VOLTAGE COMPENSATED SERVOSYSTEM

Orville K. Doolen, Oakmont, Pa., assignor to Gulf Research & Development Company, Pittsburgh, Pa., a corporation of Delaware Filed Dec. 23, 1957, Ser. No. 704,367

7 Claims. (Cl. 318—28)

This invention relates to an improvement in potentiometric recording apparatus and in particular concerns apparatus for neutralizing the slider potential which occurs at the sliding contact of the potentiometer in such devices.

Whenever a sliding contactor (hereafter termed slider) moves on a slide wire or rheostat there is developed a spurious potential difference between the slider and the wire on which it is sliding. This spurious potential is believed to arise from a complex combination of tribo-electric and thermo-electric effects. It is known that the spurious potential difference disappears when the slider remains at rest, and that it increases approximately in proportion to the speed of movement of the slider, and that its polarity is independent of the direction of movement of the slider. This spurious potential difference will hereinafter simply be termed slider potential.

In self-balancing potentiometers the above-mentioned slider potential can be very troublesome particularly if the potentiometer is required to have high sensitivity. In such potentiometers the potentiometer slider is moved by a servo-motor which is part of a servo-system that eventually finds the balance point. However the above-mentioned slider potential, being irreversible in character, distorts the manner in which the servo system approaches the balance point. The effect of the slider potential usually manifests itself as an asymmetry in operation. The potentiometer may balance well if it approaches the balance point from one direction, but overshoot occurs if it approaches the balance point from the other direction.

It is the purpose of this invention to provide a novel circuit for a self-balancing potentiometer in which the slider potential is substantially compensated.

It is customary in a self-balancing potentiometer to supply the servo system with damping in order to prevent over-shoot at the balance point. This damping can be provided by connecting to the servo-motor a generator whose voltage is proportional to the first derivative or velocity of the servo-motor motion. The first derivative signal is fed back degeneratively into the servo system and in proper magnitude to provide the desired degree of damping.

According to the present invention a small fraction of the first derivative signal available in the servo-system is passed through a rectifier, adjusted in amplitude, and applied in series with the potentiometer slider and in opposition to the slider potential so as to counterbalance the slider potential. The first derivative signal is proportional to the speed of the servo-motor, hence proportional to slider motion, and being passed through a rectifier, it is unidirectional in character so that it forms an adequate compensating signal for the slider potential.

Preferred embodiments of the invention are described in this specification of which the drawings form a part and in which.

Figure 1:
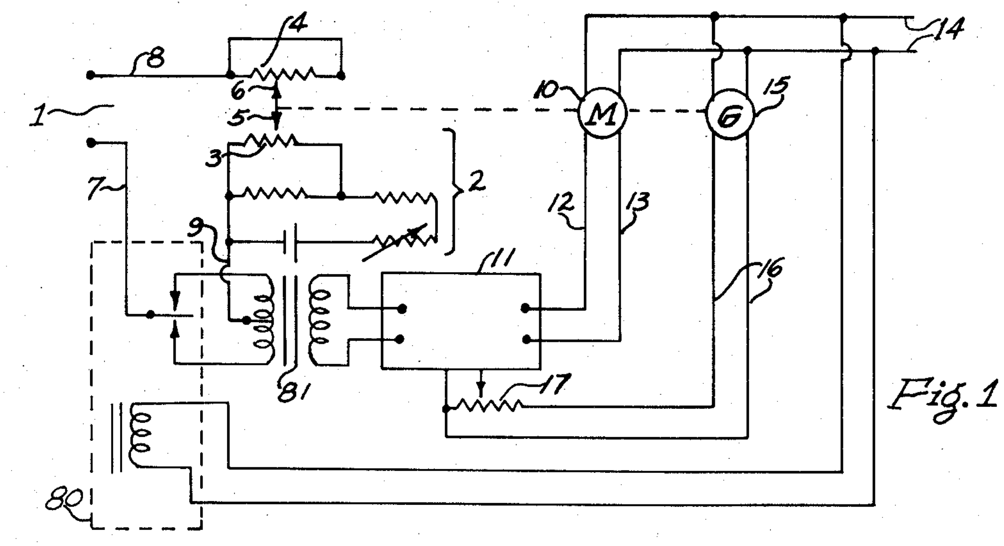
Figure 1 is a schematic wiring diagram of a self-balancing potentiometric circuit as is commonly used in the prior art.

Referring first to Figure 1, an unknown E.M.F. is applied at the terminals 1 and the purpose of the potentiometer is to measure and/or record this E.M.F. The unknown E.M.F. is in known manner balanced against an E.M.F. obtained from a potentiometer indicated generally by 2. The potentiometer slide wire 3 may be calibrated, and/or its slider 5 may be connected to a recording pen (not shown) to permanently record the value of the unknown E.M.F. when balance is achieved, and/or its slider may be connected to a controller (not shown), as is well known in the art. In order to compensate the aforementioned slider potential, it has been customary to add to the potentiometer 2 an auxiliary slide wire 4 whose ends are connected together as shown in Figure 1. The slider 6 of auxiliary slide wire 4 is mechanically and electrically connected to the slider 5. The potentiometer slide wire 3 is connected to the potentiometer working circuit in known manner as indicated in Figure 1, but all details of the potentiometer working circuit are not shown since these do not constitute part of this invention. The working circuit includes a source of working current and may include means (not shown) for maintaining this current at a proper value by comparison with the usual standard cell in well-known manner.

The sliders 5 and 6 of the slide wires 3 and 4 are both mechanically connected to servo-motor 10 usually of an A.-C. two-phase type. It is apparent that as the motor 10 moves the contactors 5 and 6, the potential across slide wire 3 will at some point exactly balance the unknown potential which is connected in series opposition in well known manner as shown by means of wires 7, 8, and 9. The error signal appearing between wires 7 and 9 is fed to the input of an amplifier 11. The amplifier 11 may include a chopper 80 of well-known type which together with transformer 81 converts the small D.-C. error potential into an A.-C. signal in proportion thereto and of phase depending upon the polarity of the error signal. The chopper 80 is driven by A.-C. from a source 14 and the chopper vibrator operates at synchronous frequency. The A.-C. output of amplifier 11 is supplied to the leads 12 and 13 and thence to one phase winding of the servo-motor 10. The other phase winding of servo-motor 10 is excited from a source of A.-C. power 14 which may conveniently be 60 cycle house current. In this way the amplifier supplies power to one phase of the motor winding 10 which is in proper phase to drive the motor in such a direction as to urge the sliders 5 and 6 toward the balance point, i.e. in such direction as to reduce the error signal.

In order to reduce hunting in the above-described system the servo-motor is arranged to also drive a small A.-C. generator 15 which is excited at the common A.-C. frequency from leads 14. The output of generator 15 is delivered by leads 16 to a voltage divider 17 and fed back into the amplifier 11, the direction of feed back being such that the signal from generator 15 tends to reduce the output of the amplifier. By proper adjustment of the voltage divider 17, together with proper design of the feed-back ratio in the amplifier, the damping may be made to have a satisfactory value. Approximately 0.7 critical damping is a good value for quick response.

In order to compensate for the slider potential developed when the potentiometer slider 5 is moved, the slider potential is balanced by an equal and opposite slider potential developed at slider 6. The slide wires 3 and 4 are identical in construction as also are the contactors 5 and 6, so that equal slider potentials will be developed in each element. It is apparent from the wiring diagram of Figure 1 that these slider potentials are in series opposition and therefore cancel each other. A disadvantage of this prior-art system of compensating the contact potential arises in that the use of two slide wires increases the cost and requires additional space, the latter being particularly objectionable in portable equipment. Furthermore, differences in wear may cause the two slide wires to develop unequal slider potentials resulting in imperfect compensation. In addition, maintenance of two slide wires requires two sliders to be periodically cleaned, lubricated, and repaired. These disadvantages are substantially eliminated by this invention.

Figure 2:
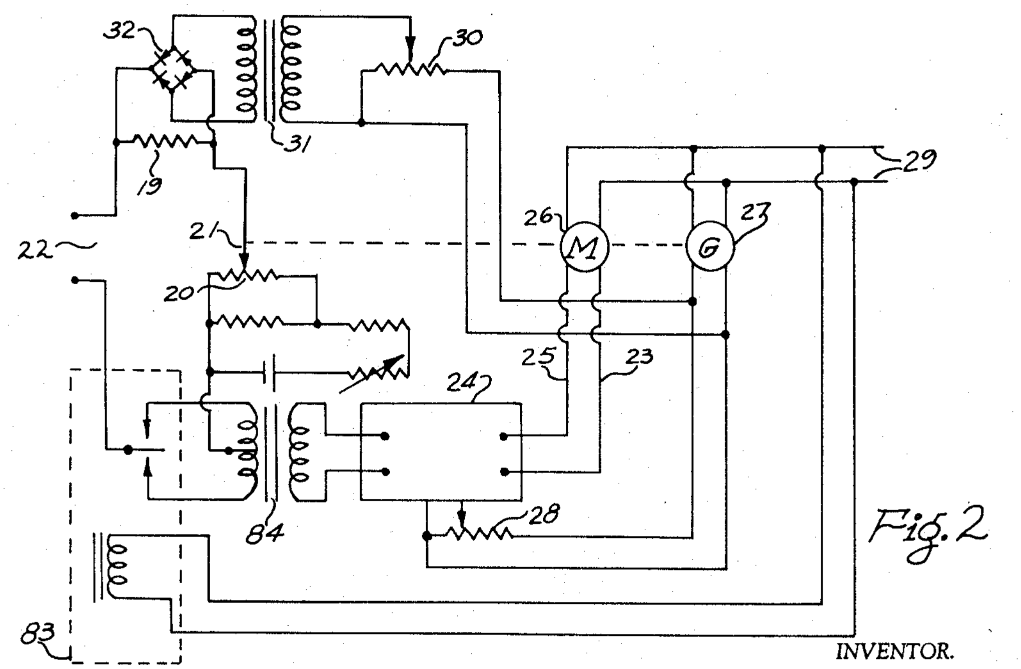
Figure 2 shows a schematic wiring diagram of an embodiment of this invention employing an A.-C. servo-system.

A schematic wiring diagram of a preferred embodiment of this invention is shown in Figure 2. A single slide wire 20 is employed with a slider 21. The slide wire 20 is connected to the potentiometer working circuit in the customary manner. The unknown E.M.F., applied at the terminals 22, is connected in series opposition to the potentiometer potential. The error signal is fed into a chopper 83, through transformer 84, and to amplifier 24 which are similar in all respects to elements 80, 81, and 11 of Figure 1. The amplifier output is fed by leads 23 and 25 to the servo-motor 26 which is mechanically connected to move the slider 21 into a position of minimum error signal. Servo-motor 26 also drives a damping generator 27 whose A.-C. output is properly adjusted by means of voltage divider 28 and is fed back into the amplifier 24, the direction of feedback being such that the signal from generator 27 tends to reduce the output of the amplifier. The elements 20 to 29 of Figure 2 perform the same functions and are similar to elements 3, 5, 1, 13, 11, 12, 10, 15, 17, and 14 of Figure 1 respectively.

In order to supply slider potential compensation, a small part of the output of generator 27 is fed through a voltage divider 30 and isolating transformer 31. The secondary of transformer 31 is connected to a resistor 19 through a rectifier. The rectifier is of a type that produces a unidirectional irreversible output for any A.-C. input. For the purposes of this invention the term "rectifier" does not include devices of the so-called "phase-sensitive rectifier" type whose output is unidirectional in the sense that it is D.-C. but whose output reverses upon attaining certain phase relationships between the A.-C. input and an A.-C. reference signal. In Figure 2 the rectifier is shown as a full-wave rectifier 32 and a full-wave rectifier is preferred. The rectifier may however be a half-wave rectifier. In either case the rectifier output may if desired be filtered before it is delivered to resistor 19. The resistor 19 is connected in a series circuit with the unknown E.M.F. 22, slide wire 20 with its contact 21, and the input circuit of amplifier 24. The rectifier 32 is connected to the resistor 19 in such polarity that the resulting voltage across resistor 19 is opposite to the slider potential that is developed by motion of slider 21. The magnitude of the compensating potential is proportional to the output of generator 27 which means that it is proportional to the speed of motion of slider 21. The direction of the output of rectifier 31 is however always the same, and this direction is independent of the direction of motion of generator 27. By proper adjustment of the potentiometer 30, together with proper choice of the ratio (usually step down) of the transformer 31, it is possible to obtain compensation of the slider potential developed at slider 21. It is preferred to adjust the compensation so that the potentiometer (recorder or controller) response is substantially symmetrical as the balance point is approached from either direction.

Figure 3:
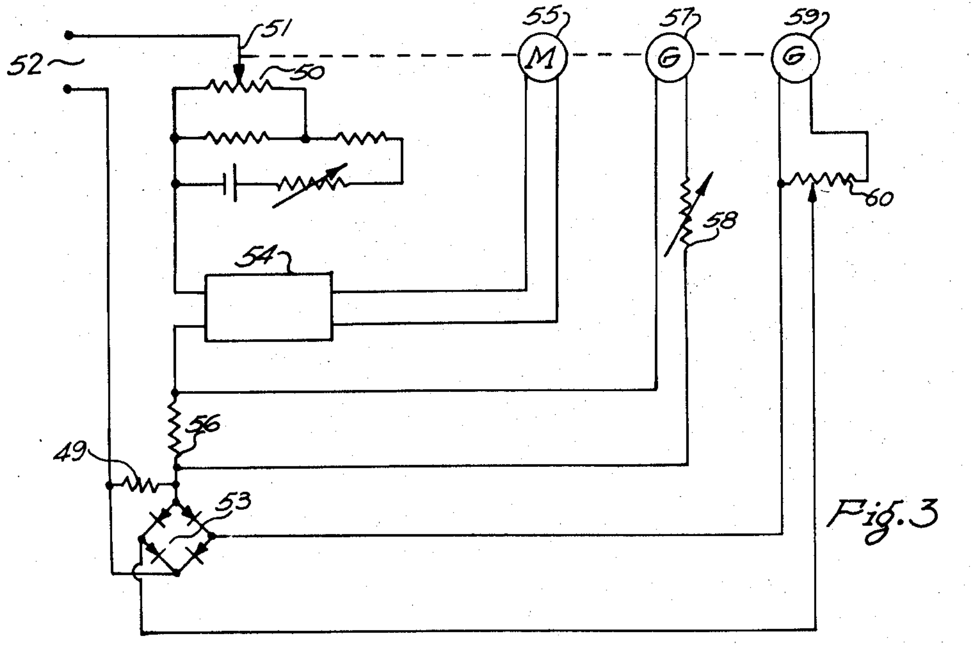
Figure 3 is a schematic wiring diagram of an embodiment of this invention using a D.-C. servo-system.

Figure 3 shows a schematic wiring diagram of an embodiment of the invention as applied to a D.-C. servo-operated self-balancing potentiometer. In this type of apparatus the servo-motor may be a reversible D.-C. motor having a permanent or steady field with power supplied to the armature from a D.-C. amplifier in proportion to the error signal. In Figure 3 the slide wire 50 is connected to the potentiometer working circuit in customary manner and has slider 51. The unknown E.M.F. applied at terminals 52 is connected in series opposition to the slide-wire potential through series resistors 49 and 56, the error signal being applied to the input of D.-C. amplifier 54. The servo-motor 55 is mechanically connected to move the slider 51 into a position of minimum error signal. Damping is provided by D.-C. generator 57 which is also mechanically connected to servo-motor 55. The D.-C. generator 57 is of a type whose polarity reverses upon reversal of its direction of rotation and it may for example have a permanent magnet field. The output of generator 57 is adjusted by means of a voltage divider comprising resistor 56 and variable resistor 58. The voltage across resistor 56 is applied in series with the input circuit to the amplifier 54 in such direction so as to reduce the signal input to the amplifier and thereby provide the desired degree of damping.

In order to compensate for the slider potential in the circuit of Figure 3 a small auxiliary generator 59 is also driven by the servo-motor 55 and supplies current through voltage divider 60 to the A.-C. terminals of a full-wave rectifier 53. The D.-C. terminals of rectifier 53 are connected to resistor 49. Inasmuch as the slider potential developed at slider 51 is always very small, the generator 59 may be very small and requires insignificant space, weight, or power. A voltage divider 60 is connected to generator 59 and serves as a means of adjusting the signal input to the full-wave rectifier 53. Inasmuch as the output of generator 59 is run through the full-wave rectifier 53, the generator 59 may be an A.-C. generator or a D.-C. generator of the same type as D.-C. generator 57. If an A.-C. generator is used for generator 59, the rectifier 53 may be a half-wave rectifier. In any case the output of the rectifier may be filtered if desired. The rectifier 53 develops across resistor 49 a D.-C. signal whose magnitude is proportional to the speed of movement of slider 51, and the rectifier 53 is connected in the potentiometric circuit in such direction that the potential across resistor 49 effectively balances the slider potential caused by motion of the slider 51. The system shown in Figure 3 has the advantage of not requiring outside power for its operation and is therefore preferred for portable operation. The D.-C. amplifier 54 may be any known type of device and may include a chopper and synchronous rectifier as is well known in the art. The circuit of Figure 3 is conventional except for the addition of elements 49, 53, 59, and 60 and the above-described manner in which they are connnected to the potentiometric circuit.

Figure 4:
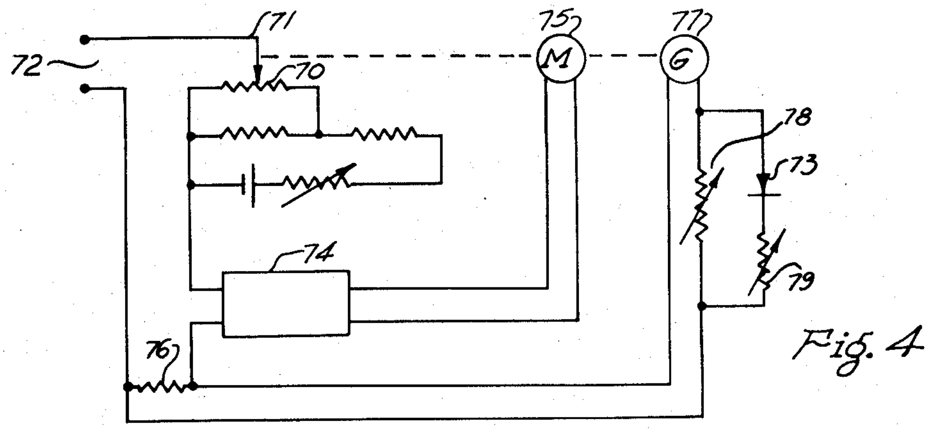
Figure 4 is a schematic wiring diagram of a simplified embodiment of this invention using a D.-C. servo-system.

Figure 4 shows a schematic wiring diagram of a simplified embodiment of the invention as applied to a self-balancing potentiometer employing a D.-C. servo-system similar to that of Figure 3. In Figure 4 the potentiometer with its slide wire 70, slider 71 mechanically connected to and moved by D.-C. servo-motor 75, and amplifier 74 are in all respects similar to corresponding elements 50, 51, 55, and 54 of Figure 3 described above. The unknown E.M.F. is applied at terminals 72. A D.-C. generator 77 is mechanically coupled to the motor 75 and the output of generator 77, adjusted by means of the voltage divider comprising resistor 76 and variable resistor 78, is employed for damping in well-known manner.

Since the slider potential which is generated at the potentiometer slider 71 when the slider is moved is always in one direction, it manifests itself (unless compensated) as an asymmetry in behavior of the system in approaching the balance point. When approaching the balance point from one direction the balance is properly reached, whereas when approaching the balance point from the other direction an overshoot occurs. The slider potential and its resultant asymmetry is compensated in Figure 4 by connecting rectifier 73 in series with a variable resistor 79 and connecting this series branch in parallel with the variable resistor 78. The branch 73—79 will then allow more current to pass through resistor 76 when the generator 77 runs in one direction than when it runs in the other direction. The resulting asymmetry in the fraction of generator signal introduced into the potentiometric circuit is made equal and opposite to that caused by the slider potential. The magnitude of the asymmetry is adjusted by adjusting resistor 79, and the proper direction is obtained by connecting the rectifier 73 in the proper direction. These adjustments are most conveniently made by simple trial and observation.

In the circuit of Figure 4, the damping in the servo system is effected by the symmetrical part of the voltage across resistor 76, and slider-potential compensation is effected by the asymmetrical part of the voltage across resistor 76. The adjustment of resistor 78 determines how much symmetrical voltage is injected into the potentiometric circuit to provide damping, and the adjustment of resistor 79 determines how much asymmetrical voltage is injected into the potentiometric circuit to provide slider potential compensation.

The herein-described system of compensating slider potential in a self-balancing potentiometer may be employed in a potentiometric recorder since such recorders include a self-balancing potentiometer. The invention is further applicable to any self-balancing potentiometric device and is independent of whether the device is employed for measurement, recording, or control purposes. It is apparent also that the rectifiers 32, 53, or 73 may be of any suitable well-known type that produces a unidirectional irreversible output.

What I claim as my invention is:

1. In a self-balancing potentiometer having a potentiometer circuit including a potentiometer with a slider moved by a servo-controlled balancing motor with a generator coupled thereto, the improvement which comprises a rectifier having a unidirectional irreversible output connected to said generator adapted to rectify at least a part of the output of said generator, and means connecting said rectifier to the potentiometric circuit in such manner that electrical signal passed by said rectifier is in opposition to a spurious electrical signal generated incidentally to movement of the potentiometer slider.

2. In a self-balancing potentiometer having a potentiometer with a slider moved by a servo-controlled balancing motor with a generator mechanically coupled thereto, the improvement which comprises voltage selecting means connected to the generator adapted to deliver a selected fraction of the generator output, a rectifier having a unidirectional irreversible output, means connecting said voltage-selecting means to said rectifier and to the potentiometric circuit in such direction that the output of said rectifier opposes the spurious potential difference generated incidentally to movement of the potentiometer slider.

3. In a self-balancing potentiometer having a potentiometer with a slider moved by a servo-controlled balancing motor with a generator coupled thereto, the improvement which comprises a full-wave rectifier having A.-C. input terminals and delivering a unidirectional irreversible output to D.-C. output terminals, means energizing the A.-C. terminals of said rectifier from the generator, and means connecting the D.-C. terminals of said rectifier to the potentiometric circuit in such direction that the output of said rectifier opposes the spurious potential difference generated incidentally to movement of the potentiometer slider.

4. In a self-balancing potentiometer having a potentiometer with a slider moved by a servo-controlled balancing motor with an A.-C. generator mechanically coupled thereto, the improvement which comprises a transformer with a pair of electrically-isolated windings, a rectifier having a unidirectional irreversible output, means connecting one winding of said transformer to the A.-C. generator, means connecting the other winding of said transformer to said rectifier and to the potentiometric circuit in such direction that the output of said rectifier opposes the spurious potential difference generated incidentally to movement of the potentiometer slider.

5. In a self-balancing potentiometer having a potentiometer with a slider moved by a servo-controlled balancing motor, the improvement which comprises a D.-C. generator mechanically coupled to the servo-motor, a full-wave rectifier having A.-C. input terminals and delivering a unidirectional irreversible output to D.-C. output terminals, means connecting the A.-C. terminals of said rectifier to said D.-C. generator, and means connecting the D.-C. terminals of said rectifier to the potentiometric circuit in such direction that the output of said rectifier opposes the spurious potential difference generated incidentally to movement of the potentiometer slider.

6. In a self-balancing potentiometer having a potentiometer with a slider moved by a servo-controlled balancing motor, the improvement which comprises an A.-C. generator mechanically coupled to the servo-motor, a rectifier having a unidirectional irreversible output, means electrically connecting said A.-C. generator to said rectifier and to the potentiometric circuit in such direction that the output of said rectifier opposes the spurious potential difference generated incidentally to movement of the potentiometer slider.

7. In a self-balancing potentiometer having a potentiometric circuit including potentiometer with a slider moved by a servo-controlled D.-C. balancing motor with a D.-C. generator coupled thereto and connected to the potentiometric circuit by means of an electrical network, the improvement which comprises a rectifier having a unidirectional irreversible output, and means connecting said rectifier to said electrical network so that at least a part of the generator output is transmitted by said rectifier when the slider moves in one direction and blocked by said rectifier when the slider moves in the other direction, the resulting asymmetrical generator signal in the potentiometric circuit being in the direction to oppose the spurious signal generated incidentally to movement of the potentiometer slider.

References Cited in the file of this patent

UNITED STATES PATENTS

| | | |
|---|---|---|
| 2,615,959 | Spalding | Oct. 28, 1952 |
| 2,674,708 | Husted | Apr. 6, 1954 |
| 2,766,412 | Stephenson | Oct. 9, 1956 |